March 20, 1951 E. G. HOPKINS 2,545,955

MODULATION

Filed Jan. 17, 1948 2 Sheets-Sheet 1

INVENTOR
EDWARD G. HOPKINS
BY D. G. Grover
ATTORNEY

March 20, 1951 E. G. HOPKINS 2,545,955

MODULATION

Filed Jan. 17, 1948 2 Sheets-Sheet 2

INVENTOR
EDWARD G. HOPKINS
BY S. G. Grover
ATTORNEY

Patented Mar. 20, 1951 2,545,955

UNITED STATES PATENT OFFICE 2,545,955

MODULATION

Edward Goodman Hopkins, Sydney, New South Wales, Australia, assignor to Amalgamated Wireless (Australasia) Limited, Sydney, New South Wales, Australia, a company of New South Wales, Australia Application January 17, 1948, Serial No. 2,862
In Australia February 17, 1947

9 Claims. (Cl. 332—25)

The present invention relates to phase and frequency modulation generally and more particularly to an electron beam deflection system for producing a large degree of such modulation.

One known method of producing frequency modulation consists of passing a stabilised carrier through a circuit which produces a phase displacement proportional to the instantaneous value of the modulating signal. The modulating signal is first passed through a circuit, the attenuation of which is directly proportional to frequency. The particular section of this known system which produces a phase displacement in the carrier proportional to the applied signal voltage is generally referred to as a phase modulator. The requirements for such a device are that it should produce sufficient phase displacement without departure from linearity, to satisfy the requirements of the system in which it works. If in a given system the final carrier frequency and the maximum deviation are specified, an insufficient variation in the degree of phase displacement in the phase modulation will set a limit to the lowest modulating frequency which the system can handle for a given number of frequency multiplications between the phase modulator and the final carrier.

This relationship is expressed by the following equation:

$$\Delta\theta = \frac{\Delta f}{fm}$$

where $\Delta\theta$=phase deviation
$\Delta f$=frequency deviation
$fm$=modulation frequency When a signal is multiplied, $\Delta f$ is multiplied by the same amount.

By way of illustration the present standard carriers for F.M. broadcasting and mobile operation will be considered.

For broadcasting, the maximum deviation of ±75 kc. and the minimum modulating frequency of 30 cycles make $$\Delta\theta = \frac{75\times10^3}{30}, \text{ or } 2{,}500 \text{ radians}$$

For mobile operation the figures of 15 kc. and 500 cycles make $\Delta\theta$=30 radians. Thus for an original deviation of one radian the multiplications must be 2500 and 30 respectively.

As most of the conventional phase modulation systems are restricted to an initial phase deviation of from ½ to 1 radian, it will be obvious that an undesirable degree of frequency multiplication must be employed in order to comply with the requirements of either of the services referred to.

The principal object of the present invention is to provide a simple means for producing initial linear phase deviations of several radians, thus simplifying transmitter design and greatly reducing the number of necessary multiplications.

Various methods have been suggested in the past for achieving this objective, but these prior art systems have involved the use of such complicated circuit arrangements as to greatly restrict the scope of their practical application.

Some phase modulators previously proposed for achieving the principal object of the present invention utilise the following principle:

If a H.F. carrier is divided into two channels whose phase relationship is 90 degrees, and these two signals are modulated in such a way that the amplitude of one is proportional at any instant to the sine of the modulating signal and that of the other is proportional to its cosine, then the sum of the two represents a carrier of constant amplitude whose phase displacement from the original carrier is directly proportional to the instantaneous value of the modulating signal. A discussion on this principle is given by Samuel Sabaroff in "Communications" of September 1941. As the present invention is based on the same general principle, the previous scheme will be considered in brief.

The requirements for such a system are as follows:

1. A circuit which divides the carrier into two channels, the phase difference between which is 90 degrees.

2. Two balanced modulators, one for each channel.

3. A system which is placed between the modulating signal and each modulator, such that the voltage applied to one modulator will follow the sine of the modulating voltage and that applied to the other modulator will follow the cosine of the modulating voltage.

4. Means for adding the outputs of the modulators in a linear manner.

In previous systems item (1) usually consists of a simple capacitor-resistor circuit, (2) of standard mixer type tubes, at least two tubes being necessary for each modulator, and (4) of a H.F. transformer. How to comply with the requirement (3) has presented the greatest difficulty in these previous systems. A prior known system uses for this purpose a C.R. tube with a sine shaped mask on the screen. By applying a supersonic deflecting voltage to the vertical deflecting plates, a vertical line trace is formed on the screen and this line is deflected across the mask by the modulating voltage. The desired sine and cosine relationship is obtained by utilising the light output from the screen. With this arrangement, however, the supersonic output must be rectified before applying it to the modulators (2).

In the system described by S. Sabaroff, hereinbefore referred to, this sine law is obtained by projecting a sine shaped light image onto a galvanometer mirror and thence to a slit in front of a photoelectric cell. When the modulating voltage is applied to the galvanometer, the photocell output follows the required sine law. The system must be duplicated in order to obtain the cosine relationship for the other modulator.

It will be readily appreciated that the above systems are complicated and unwieldy and require many vacuum tubes besides the special apparatus for producing the sine and cosine laws.

It is therefore a further object of the present invention to provide an improved modulation system based on the principles outlined above in which the requirements (2) and (3) referred to are achieved by the used of a single valve.

The objects are achieved by providing, in accordance with the present invention, an electron beam discharge device having means for producing two grid controlled electron beams, said device functioning when supplied at the control grids with two carriers of equal frequency and phase quadrature relationship to produce two carriers modulated with a sine and cosine law with respect to modulating voltage, means whereby said carriers are added linearly in the anode system and an associated output circuit to give a phase modulated carrier of constant amplitude.

More specifically, a phase modulation system, in accordance with the present invention, comprises in combination an electron beam discharge device having a cathode or cathodes, means for deriving from said cathode or cathodes a pair of electron beams, means for independently modulating the intensity of said beams with H.F. energy in phase quadrature, an apertured plate spaced apart from said cathode or cathodes, each aperture having an associated anode electrode housed in screened compartments on the face of said plate remote from said cathode or cathodes, means for focussing said beams in spaced relationship on said apertured plate, means for linearly deflecting said beams across said apertures in dependence upon signal modulating potentials, and means for deriving output potentials from said anodes.

Still more specifically the phase modulating system, in accordance with the present invention, comprises, in combination, a thermionic valve having a cathode or cathodes, two independent control electrodes and an accelerating electrode with or without an additional focus electrode, the function of these electrodes being to produce two electron beams of rectangular cross-section, means for modulating the intensity of said electron beams with H.F. energy in phase quadrature relationship, electrostatic or electromagnetic deflecting means for producing an equal deflection of each beam at right angles to its longer cross sectional dimension and linearly dependent on the modulating signal energy, a blanking plate with apertures cut in it in such a way that in any position of the beams the portion of one beam Y, which is allowed to pass through will bear the relationship $Y=\pm K \sin X$, where X is a distance measured from a predetermined position of this beam to its present position, and the portion of the other beam Z will bear the relationship $Z=\pm K \cos X$, a series of anodes each placed directly behind an opening in the blanking plate and connected in two sets in such a way that the difference in the currents flowing to the sets from each beam follows the relationship $Y=K \sin X$ and $Z=K \cos X$, means for deriving output energy from said anodes, and screening means for preventing interaction between the electron streams passing to adjacent anodes.

For a more complete understanding of the invention and the manner in which it is to be carried out attention is now directed to the following description in connection with the accompanying drawings in which.

Figure 1:
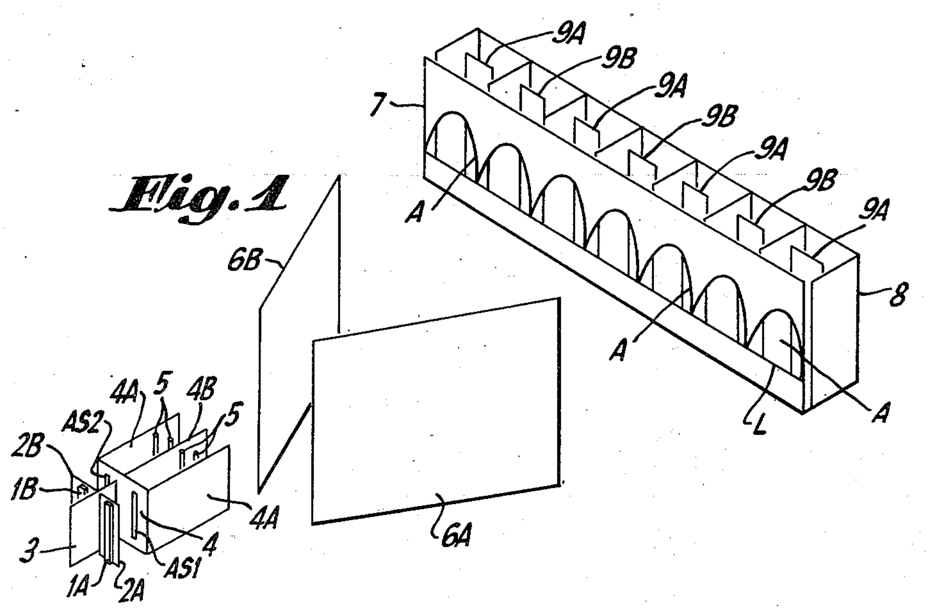
Figure 1 is a schematic diagram showing the electrode arrangement in one particular embodiment of an electron beam deflection device employing the principles of the present invention.
Figure 2:
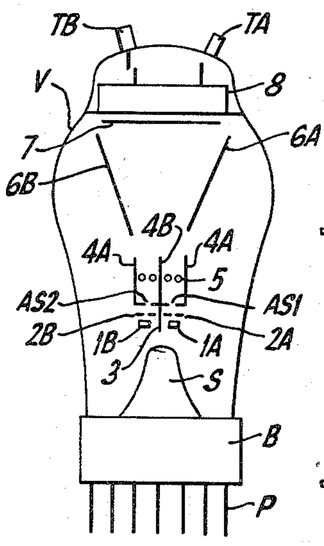
Figure 2 represents a modification of the arrangement indicated by Figure 1 and illustrates the general layout of the electrode system within an evacuated envelope.

Referring to the figures in the drawings in which like parts are designated by similar reference numerals, a thermionic valve V is provided with two conventional heater cathode assemblies 1A and 1B each situated opposite the slit in the respective one of its control grid electrodes 2A and 2B. A shield 3 is supported in any convenient manner between the two grid-cathode assemblies. Each grid is brought to a separate connection while the two cathodes and the shield are connected together. An accelerating anode 4 having two slits AS1 and AS2 is mounted so that the slits AS1 and AS2 respectively register with the slits GS1 and GS2 (see Figure 4) of the control grid electrodes 2A and 2B and are at an appropriate distance therefrom.

Each side of the anode 4, which is parallel to the long dimension of the anode slits AS1 and AS2 is provided with an anode extension 4A. The extensions 4A are disposed in parallel planes and extend along the longitudinal axis of the tube from that side of the anode which is remote from the cathodes 1A, 1B.

A further extension 4B is attached to the anode 4 intermediate the extensions 4A in a plane which is parallel to the planes of the extensions 4A and co-extensive with the plane of the shield 3 to partition the space path effected by the anode 4 into two paths which are symmetrically disposed with respect to their associated anode slits.

Focussing electrodes of any convenient form, such as the single rods 5, are supported in the present example in spaced relationship within the space defined by the anode extensions 4A and 4B, one on either side of the electron paths leading from the individual cathodes 1A and 1B to the blanking plate 7. The focussing electrodes 5 are connected together and brought out to a separate connection.

The electrode arrangements thus far described function to provide two separate beams of electrons. Any convenient electron gun system which will provide two spaced electron beams of the type hereinafter described may be employed without affecting the scope of the invention.

In the present example electrostatic deflection is employed, two deflecting plates 6A and 6B being supported in the space between the focussing electrodes 5 and the blanking plate 7 in any convenient manner to produce simultaneous deflection of the electron beams from the cathodes 1A and 1B across the apertures A in the blanking plate 7. The deflector plates 6A and 6B are provided with separate connections.

The blanking plate 7 is supported so that its length is disposed transversely to the longitudinal axis of the tube and parallel to the deflection path of the spaced electron beams.

The plate 7 is provided with sine shaped apertures A and is conductively connected to the accelerating anode 4 by a connection (not shown) of low inductance. The anode 4 and the plate 7 are connected through a common lead to a separate input connection (also not shown).

The suppressor assembly consists of a plate-like member 8 provided with a number of partitions which are so disposed as to form together with the plate 8 a number of compartments each behind a sine shaped aperture A in the blanking plate 7. The plate 8 of the suppressor electrode assembly is conductively joined to the cathodes 1A and 1B by a connection of low inductance (not shown), the whole then being placed in communication with a separate terminal.

In the example indicated by Figure 1 the tube V has plate-like members constituting anodes 9A and 9B which are insulatedly supported in individual compartments of the suppressor electrode embracing the plate 8 and are disposed so that one of their broad surfaces faces the associated aperture A in the blanking plate 7. The anodes 9A and 9B are connected together in sets so that all anodes marked 9A are connected together and placed in communication with one terminal and all those marked 9B are connected together and placed in communication with another terminal.

The two sets of anodes 9A and 9B are, in the present invention, connected to terminals TA and TB respectively in the top of the tube V whilst all other electrodes are connected through the stem S to appropriate contact pins P located in the base B of the tube V.

From the foregoing description it will be seen that the electrodes which produce the electron beams are the equivalent in electron optics of cylindrical lenses, that is, they have a refractive effect only in one plane. The combination of the grid and anode slits functions to form what is also referred to in electron optics as an immersion objective lens which forms a cross-over point in each beam near the plane of the anode slit. The combination of the focussing rods 5 within the structure of the accelerating anode 4 forms what is known as a symmetrical electron lens.

Figure 3A:
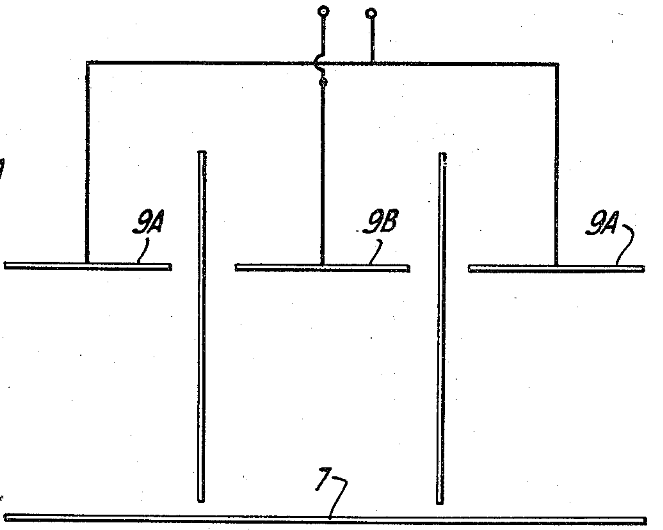
Figure 3A is a detail showing one method of connecting the anodes.
Figure 3:
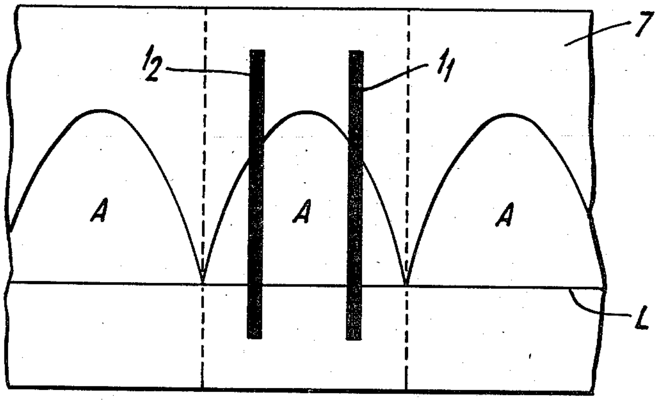
Figure 3 shows the physical relationship of the electron beams focussed on the apertured plate.

When the correct ratio of voltages is applied to the electrodes, 4 and 5, electron images $I_1$ and $I_2$ of the anode slits AS1 and AS2 respectively, are thrown onto the blanking plate 7 as shown in Figure 3. In this figure it will be seen that these images are at right angles to the base line L of the blanking apertures A and that they extend above and below the apertures due to the divergent or unfocussed nature of the beam in this dimension. Figure 3 shows the position of the beams when no deflection is present. The requirements of the current density distribution of these electron images is that along the greater dimension the density should be constant and that across the shorter dimension the density should be symmetrically distributed on either side of some centre line. If these two condtions hold for any working value of beam current, then it can easily be proved that the current entering a sine shaped aperture will be proportional to the sine value corresponding to the position of the centre line of the beam. The actual width of the beam is not important, provided the above conditions hold. When the beam has passed the blanking holes, its cross-sectional dimensions are no longer important and it may be directed to an anode by the suppressor assembly which includes the plate 8.

The suppressor assembly being at cathode potential prevents an interchange of secondary electrons between the blanking plate and the anodes and also between separate anodes.

The output from a tube constructed along the lines outlined above depends on the mutual conductances between the control grids and the anodes connected in a differential circuit. Thus it will be seen that for one beam this mutual conductance (and also the difference current) will be an exact sine function of the beam position (in both positive and negative senses).

As the two beams $I_1$, $I_2$ are maintained in fixed relationships they will be moved by the same amount for any deflection. It is obvious therefore that if their separation is made equivalent to 90 degrees of the sine shaped apertures, then one beam can be said to follow a cosine law while the other follows a sine law. The deflection system must, however, deflect both beams in a strictly linear relationship with the voltage or current applied to it. In the case of electrostatic deflection, the desired effect may be achieved by the use of a balanced deflection system.

In the case of a small departure from linearity of deflection due, e. g., to the field gradient varying between the plates, the sine apertures can be suitably expanded towards the outer parts to compensate for this effect. If the angle of deflection is sufficiently wide to warrant it, the apertures A in the plate 7 could be arranged in an arc or a compression of the sine shapes could be used.

From the above it will be seen that the two beam systems constitute two balanced modulators whose outputs are directly added and which follow a sine and cosine law over a number of cycles, depending only on the dimensions of the tube, thus providing a simple means whereby the requirements 2 and 3 of the phase modulation system hereinbefore outlined may be carried out in a single tube.

Figure 4:
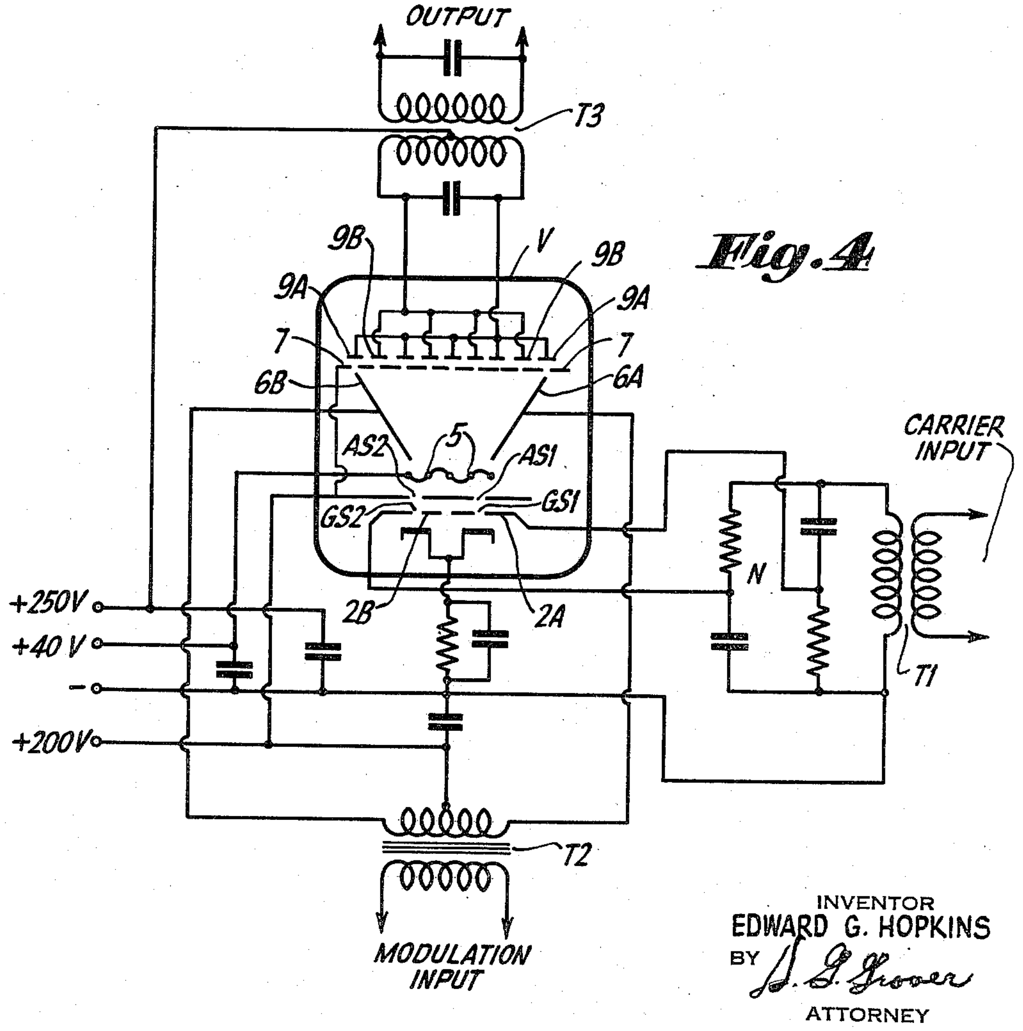
Figure 4 shows the circuit arrangement used in conjunction with the device illustrated in Figure 1.

A suitable circuit arrangement of a phase modulation system employing a tube of the type hereinbefore described is illustrated in Figure 4. Referring to this figure carrier frequency energy from any convenient source is applied in equal amplitude and in phase quadrature relationship to the grids 2A and 2B of the tube V through the input transformer T1 and the phase shifting network N.

The phase shifting network N functions to shift the phase of the voltage fed to the input grids 45 degrees on either side of the carrier. Any conventional form of phase shifting network such as will provide the desired phase relationship of the voltages fed to the grids may be employed. In the present example the well known resistance capacity phase shifting arrangement is illustrated.

The two electron beams produced within the tube are independently modulated with carrier frequency energy in phase quadrature relationship, thus dividing the carrier into two channels whose phase difference is 90 degrees.

Signal modulating potentials are applied in balanced relationship to the deflecting plates 6A, 6B through the L.F. coupling transformer T2.

Output potentials on the anodes 9A, 9B of the tube V are fed to a succeeding stage through the balanced coupling transformer T3.

The application of the signal modulating potentials to the deflecting plates 6A, 6B causes the two H.F. modulated electron beams, $I_1$, $I_2$ to be linearly deflected across the sine-shaped apertures A in the blanking plate 7. As the fixed spacing between the beams is equivalent to 90 degrees of the sine-shaped apertures, the output from one beam will follow a sine wave law and the output from the other a cosine law.

The outputs of the electron beams are added linearly in the output circuit associated with the anodes 9A, 9B to produce carrier frequency energy of constant amplitude modulated in phase in accordance with the amplitude of the signal energy applied to the deflecting plates 6A, 6B.

The extent of the phase deviation depends upon the number of apertures A in the plate 7 traversed by the deflection path of the beams.

In one practical embodiment of the invention the separation between the electron beams was made 7 mm. and the length of each sine-shaped aperture was 14 mm. A length of 25 mm. for the blanking plate thus produced a phase shift in the final output of ±100 degrees.

The beams could, however, be focussed into a much narrower width and brought closer together than the distance specified above, thus enabling a much greater phase deviation to be obtained. The use of a single second lens instead of two would facilitate this.

For example, for an available length of 3 cm. for the blanking plate 7, suppose a beam spacing of 2 mm. is used, the length representing 90 degrees of a sine aperture is also 2 mm. and the total phase displacement $$\frac{30-2}{2}\times 90 \text{ degrees}=1260^\circ$$

Thus, the available phase deviation would be ±11 radians. In the two applications previously mentioned, a multiplication of $$\frac{30}{11} \text{ or } 3$$

in the mobile case or $$\frac{2500}{11} \text{ or } 250$$

in the case of the broadcasting service would be necessary. At carrier frequencies of 100 megacycles, the crystal frequency would be over 20 megacycles for mobile and .4 mc. for broadcast service.

In the circuit of Figure 4, the requisite operating potentials may be applied to the various electrodes of the valve in conventional manner from any convenient potential supply source or sources (not shown).

In one practical arrangement the following voltages were measured relative to the cathode:

| | |
|---|---|
| 2A and 2B | −7 volts |
| (4) | +200 volts |
| (5) | +40 volts |
| 6A and 6B | 200 volts ±80 volts |
| 9A and 9B | 250 volts |

Having now fully described and ascertained my said invention and the manner in which it is to be performed I declare that what I claim is:

1. In a phase modulation system, means for producing a pair of electron beams, means for independently varying the intensity of said beams in accordance with carrier frequency voltages in phase quadrature relationship, an apertured plate in the paths of said beams upon which said beams are caused to impinge in spaced relationship, a plurality of anodes equal in number to the number of apertures, each anode being housed in a separate compartment which communicates with a corresponding aperture and which is located on the face of said plate remote from the point of origin of said beams, means for deflecting said beams across said apertures in dependence upon modulating potentials, and means for deriving output potentials from the several anodes.

2. In a phase modulation system, means for producing two electron beams of substantially rectangular cross-section, means for independently varying the intensity of said beams in accordance with carrier frequency voltages in phase quadrature relationship, means for producing an equal deflection of each beam at right angles to its longer cross-sectional dimension in dependence upon modulating energy, an apertured plate in the paths of said beams, said plate having its apertures so disposed that in any instantaneous position of said beams the portion Y of one beam which is allowed to pass through said apertures is equal to $\pm K \sin X$, where K is a constant and X is a distance measured from a predetermined position of said one beam to its position at that instant, and the portion Z of the other beam which is allowed to pass through said apertures is equal to $\pm K \cos X$, a plurality of anodes one of which is placed directly behind each aperture in said plate, means connecting said anodes in two groups in such manner that the difference in currents flowing to said groups from each of said beams follows the relationship $Y=K \sin X$ and $Z=K \cos X$, means for preventing interaction between the electron streams flowing to adjacent anodes, and means including in part said connecting means for deriving output potentials from said anodes.

3. A phase modulation system as defined in claim 2, wherein the means for producing the two electron beams includes two control grids with slits therein and an adjacent anode with similar slits, the slits having such outline as to impart to said beams a cross-section which is long and narrow.

4. A phase modulation system as defined in claim 2, wherein the apertures in said plate are of substantially sinusoidal outline and wherein said connecting means connects said anodes alternately in two groups.

5. A phase modulation system as defined in claim 2, wherein the apertures in said plate are of substantially sinusoidal outline, wherein said connecting means connects said anodes alternately in two groups, and wherein said means for deriving output potentials includes a balanced coupling transformer from which is derived resultant carrier frequency energy of constant amplitude modulated in phase in accordance with the amplitude of the modulating energy.

6. In a phase modulation system for modulation of a carrier frequency voltage, means for producing two electron beams, means for independently varying the intensity of said beams in accordance with voltages of said carrier frequency in phase quadrature relationship, an apertured plate in the paths of said beams, the apertures therein being of substantially sinusoidal outline, and means for deflecting said beams across said apertures in dependence upon modulating potentials.

7. In a phase modulation system for modulation of a carrier frequency voltage, means for producing two electron beams, means for independently varying the intensity of said beams in accordance with voltages of said carrier frequency in phase quadrature relationship, an apertured plate in the paths of said beams, the apertures therein being of substantially sinusoidal outline, means for deflecting said beams across said apertures in dependence upon modulating potentials, and an electron-receiving electrode system in the paths of said beams and behind said plate, comprising a plurality of electrodes connected in two groups, the arrangement being such that the output from one beam conforms to a sine law and the output from the other beam conforms to a cosine law.

8. A phase modulator electron beam discharge device comprising means for producing a pair of electron beams, a control electrode in the path of each beam for independently varying the intensity of said beams in accordance with carrier frequency voltages in phase quadrature relationship, an apertured plate in the paths of said beams upon which said beams are caused to impinge in spaced relationship during operation of said device, a plurality of anodes equal in number to the number of apertures, each anode being housed in a separate compartment which communicates with a corresponding aperture and which is located on the face of said plate remote from the point of origin of said beams, deflecting electrode means for deflecting said beams across said apertures in dependence upon modulating potentials, and terminal means for deriving output potentials from the several anodes.

9. A phase modulator electron beam discharge device comprising means for producing two electron beams, a control electrode in the path of each beam for independently varying the intensity of said beams in accordance with carrier frequency voltages in phase quadrature relationship, an apertured plate in the paths of said beams, the apertures therein being of substantially sinusoidal outline, and deflecting electrode means for deflecting said beams across said apertures in dependence upon modulating potentials.

EDWARD GOODMAN HOPKINS.

REFERENCES CITED

The following references are of record in the file of this patent:

UNITED STATES PATENTS

| Number | Name | Date |
| --- | --- | --- |
| 2,201,323 | Shelby | May 21, 1940 |
| 2,294,209 | Roder | Aug. 25, 1942 |
| 2,337,272 | Roberts | Dec. 21, 1943 |